(12) United States Patent
Toshimitsu

(10) Patent No.: US 6,473,228 B1
(45) Date of Patent: Oct. 29, 2002

(54) MICROSCOPE

(75) Inventor: Kunio Toshimitsu, Yokohama (JP)

(73) Assignee: Nikon Corporation, Tokyo (JP)

( * ) Notice: Subject to any disclaimer, the term of this patent is extended or adjusted under 35 U.S.C. 154(b) by 72 days.

(21) Appl. No.: 09/663,099

(22) Filed: Sep. 15, 2000

(30) Foreign Application Priority Data

Sep. 16, 1999 (JP) ............................................ 11-261420

(51) Int. Cl.$^7$ ............................................... G02B 21/00
(52) U.S. Cl. ...................... 359/368; 359/369; 359/380; 359/388
(58) Field of Search ................................. 359/368, 369, 359/380, 388; 250/306, 310, 392, 492.2, 311, 396 ML, 396 R

(56) References Cited

U.S. PATENT DOCUMENTS 5,475,218 A  * 12/1995  Kakibayashi et al. ........ 250/311
5,732,150 A  *  3/1998  Zhou et al. ............... 250/461.2
6,191,423 B1 *  2/2001  Krijn et al. ............ 250/396 ML
6,274,876 B1 *  8/2001  Kawanami et al. ........... 250/306

* cited by examiner

Primary Examiner—Mohammad Sikder
(74) Attorney, Agent, or Firm—Oliff & Berridge, PLC

(57) ABSTRACT

A specimen of transparent living material is covered over with a cover glass while being observed. An optical image of this specimen captured by an objective lens includes spherical aberration due to the cover glass. The spherical aberration included in the optical image is corrected by a correction optical system. Imaging is performed while varying this spherical aberration correction amount. From the plurality of images which have been imaged, an image is selected whose spherical aberration is the least, according to increase and decrease of contrast. Imaging is performed while driving the correction optical system so as to bring the spherical aberration correction amount to be equal to that when the selected image was imaged.

13 Claims, 4 Drawing Sheets

MICROSCOPE

INCORPORATION BY REFERENCE

The disclosures of the following priority application is incorporated herein by reference:

Japanese Patent Application No. 11-261420 filed Sep. 16, 1999.

BACKGROUND OF THE INVENTION

1. Field of the Invention

The present invention relates to a microscope which incorporates an aberration correction optical system.

2. Description of the Related Art (1) When observing a test piece of transparent or semi-transparent living material (hereinafter termed the subject of observation), this subject of observation is covered over with a cover glass. In the prior art it is known for the objective lens to be designed with considerations of the thickness of the cover glass and moreover a layer of air of predetermined thickness, i.e. a predetermined working distance, to be present between the cover glass and the objective lens. Due to this, spherical aberration occurs if a cover glass is used whose thickness differs from the design value.

Accordingly, in the prior art, an objective lens fitted with a spherical aberration correction lens has been used, and spherical aberration generated due to discrepancy of the thickness of the cover glass has thus been corrected. A correction ring fitted with a graduated scale is provided to this objective lens fitted with a spherical aberration correction lens, and this correction ring is operated according to its scale by an amount just corresponding to the thickness difference of the cover glass.

On the other hand, when observing the interior of a subject of observation, the focus position is adjusted by approaching the objective lens towards the cover glass. In this case, the spherical aberration is eliminated by operating the correction ring according to the amount of shifting of the objective lens. The scale of the correction ring of a prior art objective lens fitted with a spherical aberration correction lens is graduated according to the thickness discrepancy of the cover glass. However, since there may be a discrepancy between the index of refraction of the cover glass and the index of refraction of the subject of observation, it is difficult perfectly to eliminate the spherical aberration with the graduated scale upon the correction ring, and also the operation of correction is complicated.

(2) On the other hand, there is a per se known microscope which constructs a three dimensional image (a vertically sectioned image) by performing tomography upon the above described test piece of transparent or semi-transparent living material (hereinafter termed the subject of observation). With this microscope, a plurality of plan images of the subject of observation are taken while shifting the focus position in the thickness direction of the subject of observation, and a three dimensional image is constructed from these images. When constructing this three dimensional image, a computer performs image processing upon the plurality of plan images, and obtains clear plan images. Deconvolution is one known computer image processing method of this type. This is a method of eliminating image blurring from the plan image which has been obtained, by calculation.

When performing this kind of tomography, the objective lens is shifted in order to vary the focus position inside the subject of observation, and spherical aberration occurs according to the same theory as described above. Since this spherical aberration cannot be eliminated by the deconvolution image processing method described above, the elimination of spherical aberration must be performed with an objective lens fitted with a spherical aberration correction lens. However, each time the objective lens is shifted, i.e. for each focus position, there is the difficulty of operating the correction ring and eliminating the spherical aberration, and it can happen that the spherical aberration is not perfectly eliminated while referring to the graduated scale on the correction ring.

SUMMARY OF THE INVENTION

The objective of the present invention is to provide a microscope which can simply corrects the spherical aberration which varies according to the observation position.

The microscope according to the present invention accomplishes the above objective by comprising: an objective lens which focuses upon and observes a specimen mounted upon a stage; an imaging device which receives an optical image of the specimen captured by the objective lens and outputs it as an image signal; a correction optical system provided between the objective lens and the imaging device, which corrects spherical aberration included in the optical image; an optical system drive device which drives the correction optical system to control the amount of spherical aberration correction; and a control section which drives the correction optical system by the optical system drive device so as to vary the amount of spherical aberration correction, based upon the image signal from the imaging device.

The control section may be constituted so as to: image the specimen with the imaging device while varying the amount of spherical aberration correction by the correction optical system; to select an image of which spherical aberration is the least from among a plurality of images which have been imaged by the imaging device; and to drive the correction optical system so as to bring the spherical aberration correction amount to the value when the selected image was imaged.

Furthermore, the control section may select, from among the plurality of images which have been imaged, an image of which the contrast is the greatest as the image of which spherical aberration is the least.

In the above described microscope, it is preferable to be further included an electrically operated raising and lowering device which raises and lowers the stage. In this case, the control section sets the stage to a plurality of observation positions by raising and lowering it by the electrically operated raising and lowering device; for each observation position, images the specimen with the imaging device while varying the amount of spherical aberration correction by the correction optical system with the optical system drive device; and stores in an image storage device an image of which spherical aberration is the least from among the plurality of images which have been imaged by the imaging device.

With a microscope which includes a focus detection device which calculates the focusing state of the objective lens based upon a plurality of the image signals imaged while shifting the stage along the optical axis, it is possible to shift the stage by driving an electrically operated raising and lowering device based upon the signal detected by the focus detection device. The focus detection device is able to calculate the stage position corresponding to an image of which the contrast is the greatest among the plurality of images which have been imaged based upon the image signals as the focused state.

With this type of microscope, it is preferable for the control section to select, from among the plurality of images which have been imaged, an image of which the contrast is the greatest as the image of which spherical aberration is the least.

It is possible for the control section: to image a test piece having an optical characteristics equivalent to the specimen with the imaging device; to select an image of which spherical aberration is the least from among a plurality of images which have been imaged while varying the amount of spherical aberration correction; to store the aberration correction position of the correction optical system when the selected image was obtained; and, when the specimen is being imaged by the imaging device, to read out the aberration correction position which has been stored and to drive the correction optical system. The test piece may have an equivalent index of refraction to the specimen. And the control section may be constituted so as to detect the temperature of the test piece when storing the aberration correction position using the test piece, and correct the aberration correction position based upon this detected temperature when storing it. In this case, it may calculate the difference between the temperature determined when storing the aberration correction position using the test piece, and the temperature when imaging the specimen; and may correct the aberration correction position according to the temperature difference.

The microscope according to the present invention may alternatively accomplish the above objective by comprising: an objective lens which focuses upon and observes a specimen mounted upon a stage; an imaging device which receives an optical image of the specimen captured by the objective lens and outputs it as an image signal; a correction optical system provided between the objective lens and the imaging device, which corrects spherical aberration included in the optical image; an optical system drive device which drives the correction optical system to control the amount of spherical aberration correction; and a control section which performs imaging with the spherical aberration correction amount when an image was obtained of which spherical aberration was the least among the plurality of images which were imaged by the imaging device while varying the spherical aberration correction amount.

DESCRIPTION OF THE PREFERRED EMBODIMENTS

In the following, several embodiments of the present invention will be explained in detail with reference to the figures. It should be understood that the following explanation relates to microscopes which generate a vertical sectional image of a transparent or semi-transparent item of living test material, hereinafter referred to as a subject of is observation.

Embodiment 1

Figure 1:
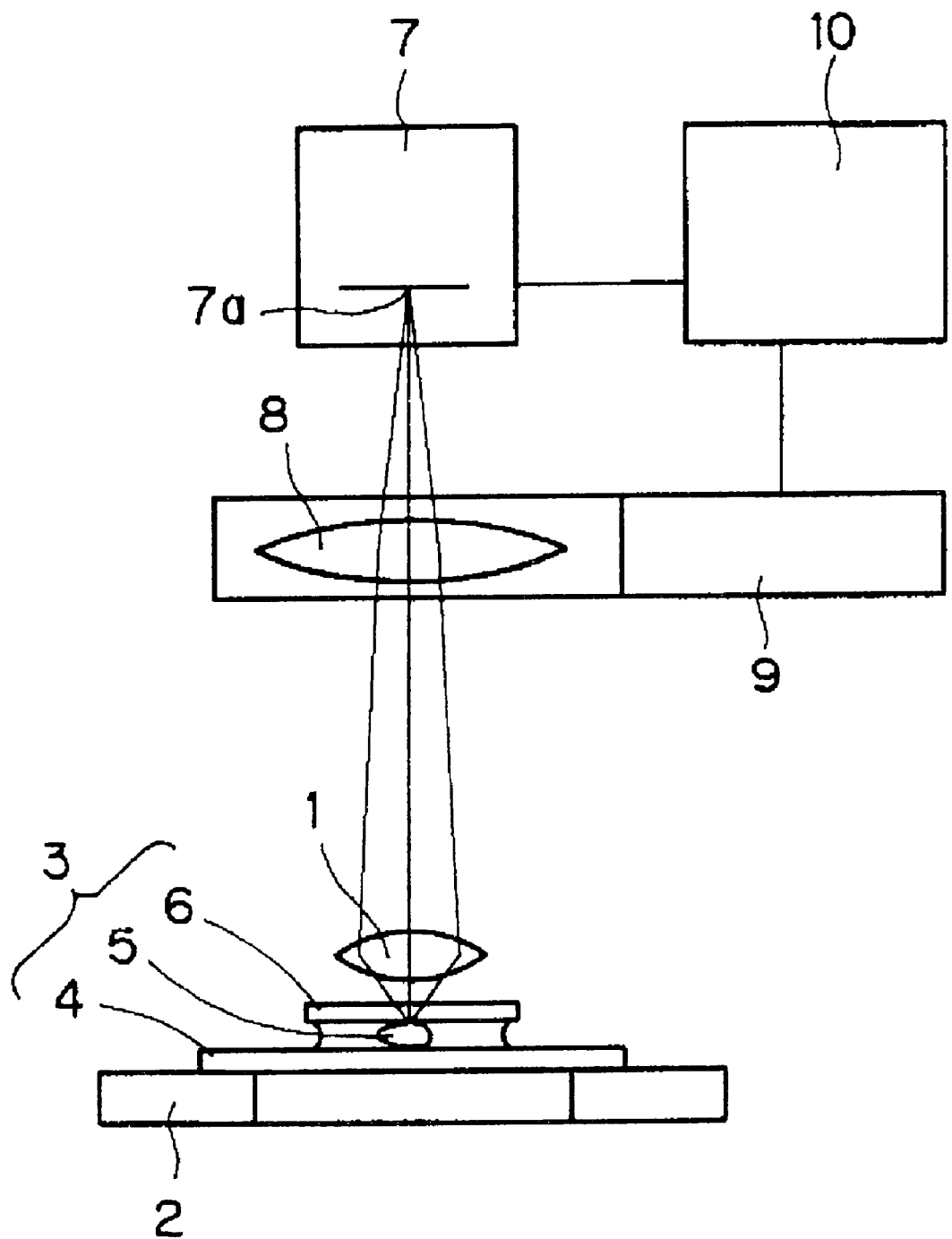
FIG. 1 is a figure showing a first preferred embodiment of the microscope according to the present invention.

FIG. 1 shows a microscope according to the first preferred embodiment of the present invention. With this microscope of the first embodiment, the operator takes a plurality of observed images while shifting his observation position. And, when the spherical aberration correction lens is moved at each observation position, the one of the images taken during this movement of which the contrast is the highest is selected as the most suitable image at this observation position.

With this microscope, a specimen 3 mounted upon a stage 2 is magnified by an objective lens 1 and is imaged by a TV camera 7. The specimen 3 consists of a subject of observation 5 laid upon a slide glass 4 and covered over with a cover glass 6. If a cover glass 6 is used whose thickness differs from the design value, spherical aberration occurs in the optical image of the subject of observation 5 which is being imaged (or captured). Or if the internal portions of the subject of observation are being observed, in other words if observation is being performed at a working distance which is different from a design value, again spherical aberration occurs in the optical image of the subject of observation 5 which is being imaged. This microscope comprises a spherical aberration correction lens 8 which corrects spherical aberration, and a correction lens drive section 9 which drives this spherical aberration correction lens 8. The TV camera 7 and the correction lens drive section 9 are controlled by a control section 10 which comprises a CPU and the like.

The TV camera 7 comprises an imaging device 7a which comprises a light receiving surface, and this imaging device 7a converts the optical image of the subject of observation which has been focused into an image upon its light receiving surface into an electrical signal which it outputs. This image signal which is output from the imaging device 7a is input to the control section 10. And this image signal which is input to the control section 10 is converted into a digital signal, is subjected to predetermined image processing, and is stored in a buffer memory. The control section 10 calculates the contrast of the stored image signal by a per se known processing method.

The spherical aberration correction lens 8 is provided between the objective lens 1 and the imaging device 7a and can be shifted along the direction of the optical axis. The control section 10 uses the correction lens drive section 9 to drive the spherical aberration correction lens 8 to a plurality of aberration correction positions for each observation position. And the control section 10 images the subject of observation in each aberration correction position with the imaging device 7a of the TV camera 7, and calculates the contrast of the resulting image based upon the image signal. And, for each observation position, the control section 10 stores that image whose contrast is the greatest as the image whose spherical aberration is the least.

Next, the operation of this microscope will be explained with reference to the flow chart shown in FIG. 2. It should be understood that procedures are included in this flow chart which are to be performed by the operator; it is not merely a list of procedures which are to be performed under the control of the program which is stored in the control section 1.

The procedure of FIG. 2 will now be explained. In a step S1 the control section 10 initializes a variable i to zero, and then in a step S2 it sets the spherical aberration correction lens 8 to an initial aberration correction position. Then in a stage S3 the observer operates a raising/lowering dial and moves the stage 2 up and down, so as to set it to an i-th observation position SPi for observing the subject of observation 5. In a step S4 the imaging device 7a of the TV camera 7 performs imaging at the i-th observation position SPi, and an image Gi of the subject of observation is taken by the control section 10. In a step S5 the control section 10 performs aberration correction upon the image which has been taken. Step S5 will be explained later in detail. In a step S6 the control section stores the image upon which aberration correction has been performed most suitably in a storage device as the most suitable image for this observation position SPi; and thereafter in a step S7 i is incremented by 1. Then in a step S8 a decision is made as to whether or not the variable i has exceeded a value of n−1. If the result of this decision is NO then the flow of control returns to the step S3, and the above steps S3 through S7 are repeated until the variable i exceeds n−1. On the other hand, if the variable exceeds n−1, then the most suitable n images which have been corrected with respect to aberration can be taken respectively at the n observation positions. And in a step S9 a vertically sectional image is composed using these n images.

The procedure in the step S5 is in general as follows.

For each observation position, the spherical aberration correction lens 8 is repeatedly shifted by a predetermined amount at a time in the direction of the optical axis, and the imaging device 7a forms an image corresponding to each such aberration correction position. And the control section 10 then selects from among this plurality of images the image whose contrast is the highest as the most suitable image at this observation position, i.e. as the image on which the aberration correction has been performed most suitably. Then the control section 10 drives the spherical aberration correction lens 8 at the position when the selected image was imaged for the imaging device 7a to form an image.

This may be achieved by using a technique so called hill climbing contrast detecting method.

In other words, when the tendency is for the contrast to increase as the spherical aberration correction lens is shifted in one direction, then the spherical aberration correction lens is shifted further and the contrast continues to be compared. When the contrast has exhibited a tendency to decrease, then the previous image is taken as the image with the greatest contrast.

In this manner, with this microscope, when taking an image of the subject of observation for each observation position, the image which has been best corrected for spherical aberration is automatically selected. Accordingly it is not necessary for the operator to actuate an aberration correction ring by hand as was the case in the prior art, and, along with enhancing the operability, the time period required for obtaining an observed image is shortened.

It should be noted that, with this first embodiment, the stage 2 is set to the observation position by being raised and lowered by hand. Accordingly, in order to establish correspondence between the observed images for which the maximum contrast has been obtained and their observation positions, it is necessary to detect the position of the stage 2 by a position detection sensor, and to establish correspondence between the images with the maximum contrast and their observation positions.

Embodiment 2

Figure 3:
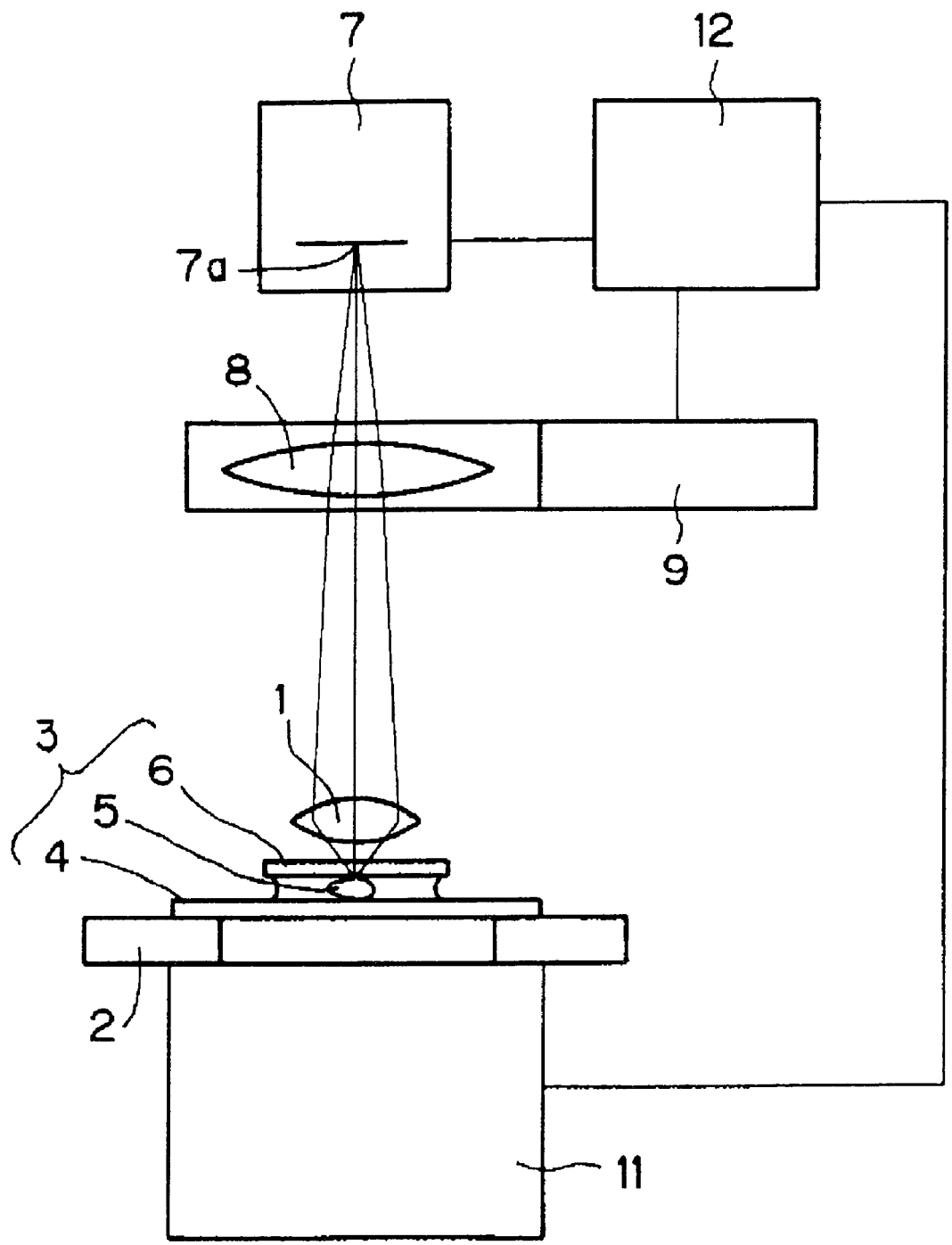
FIG. 3 is a figure showing a second preferred embodiment of the microscope according to the present invention.

FIG. 3 is a figure showing a second preferred embodiment of the microscope according to the present invention. In that figure and in the following description, the reference symbols used for parts of this second embodiment which are common with the first preferred embodiment will be the same as in the figures and the description pertaining to that first embodiment, and the explanation will principally focus upon the points of difference. In the first embodiment, the observation position was changed according to manual operation by the operator. In this second embodiment the stage 2 is raised and lowered via a stage drive section 11, and is set to a plurality of observation positions based upon commands from a control section 12. And, at each observation position, the image of the subject of observation which has the highest contrast is selected by a contrast comparison method the same as that used in the first embodiment. In this second embodiment the control section 12 obtains the position of the stage 2, and is able to store the position of the image selected as an image with the greatest contrast by establishing correspondence with the position of the stage 2.

In this manner, with this microscope according to the second embodiment, the observation position (the focus position) is shifted in the thickness direction of the subject of observation by driving the stage drive section 11 up and down electrically, and the image of greatest contrast is selected at each observation position.

Thus, in this second preferred embodiment, it is possible to take the image of the greatest contrast, i.e. the image on which spherical aberration has been best corrected, completely automatically at a plurality of observation positions merely by programming the observation positions in advance.

Embodiment 3

Figure 4:
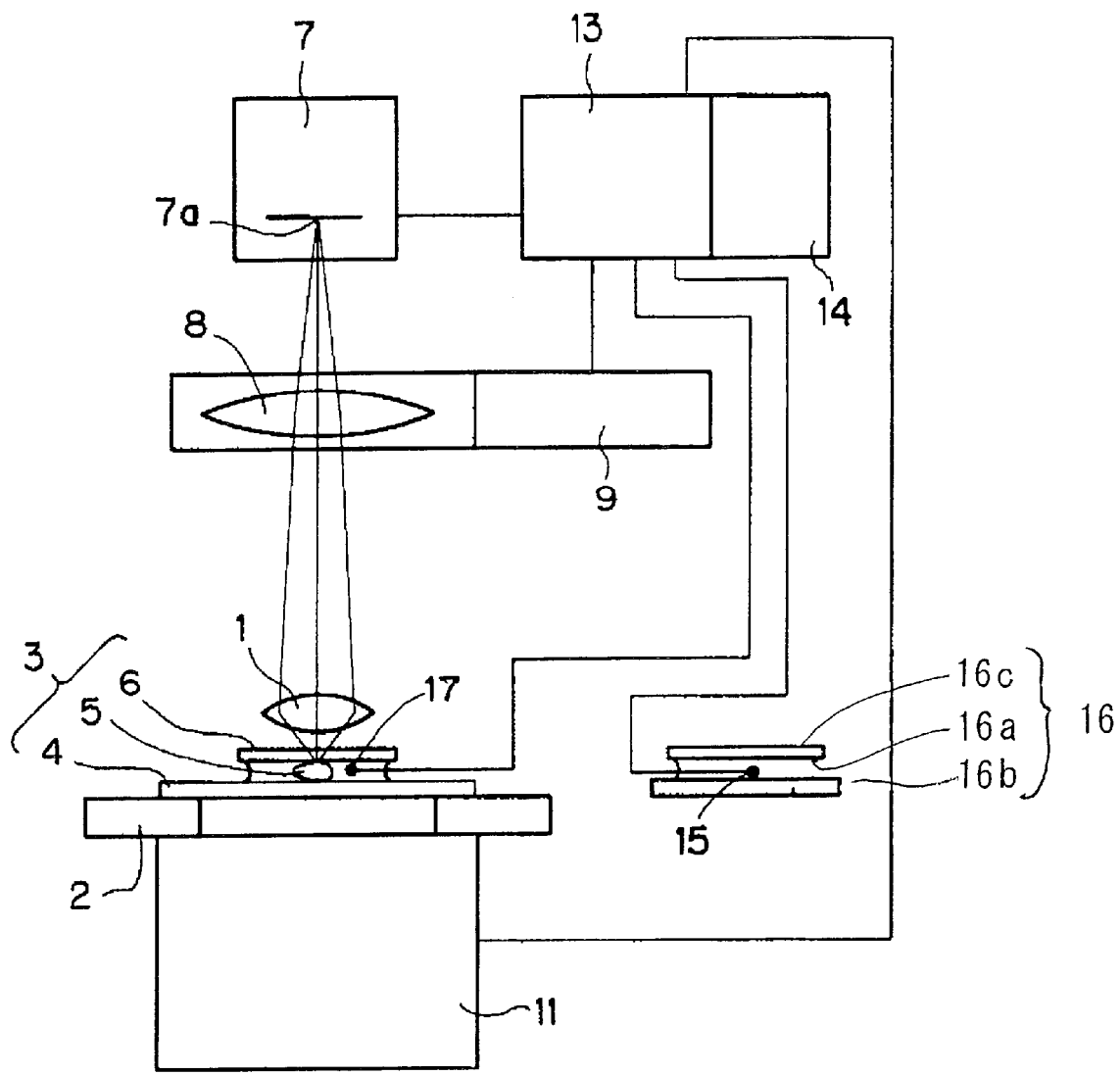
FIG. 4 is a figure showing a third preferred embodiment of the microscope according to the present invention.

FIG. 4 is a figure showing a third preferred embodiment of the microscope according to the present invention. The reference symbols used for parts of this third embodiment which are common with the second preferred embodiment will be the same as in the figures and the description pertaining to that second embodiment, and the explanation will principally focus upon the points of difference.

In this microscope according to the third embodiment, a test piece 16 which is optically equivalent to the specimen 5 is utilized. As a preparatory procedure, a test piece 16 is used, and the aberration correction position of the spherical aberration lens 8 which provides the maximum contrast for each observation position is stored according to the same procedure as in the first and the second embodiments. During actual observation, the subject of observation 5 is imaged at each observation position with the spherical aberration correction lens 8 being set to the stored aberration correction position. This will now be explained in detail.

The test piece 16 is made up by mounting an object 16a which has the same index of refraction as the subject of observation 5 upon a slide glass 16b and covering it over with a cover glass 16b which has the same index of refraction as the cover glass 6. A temperature sensor 15 is also provided to the test piece 16.

The test piece 16 is mounted upon the stage 2, and the stage 2 is set to the observation position by the stage drive device 11. And a plurality of images are taken with the spherical aberration correction lens 8 being shifted to a plurality of aberration correction positions. The control section 13 calculates the contrast of each image, and selects that one from among the plurality of images for which the contrast is the greatest. The aberration correction position of the spherical aberration correction lens 8 which corresponds to the selected image is stored in a storage section 14 of the control section 13 in correspondence to this observation position. At this time, the temperature detected by the temperature sensor 15 is also stored in association therewith.

And when imaging at each observation position the specimen 3 of the subject for observation S mounted upon the stage 2, the storage section 14 is searched based upon the observation position. Along with reading out from the storage section 14 the aberration correction position of the spherical aberration correction lens 8 corresponding to the current observation position, the control section 13 detects the temperature of the subject for observation 5 based upon a temperature signal from a temperature sensor 17 fitted thereto. The stored temperature which corresponds to the aberration correction position of the spherical aberration correction lens 8 which has been read out from the storage section 14 and the temperature which has been detected by the temperature sensor 17 are compared, and the aberration correction position of the spherical aberration correction lens 8 which has been read out is corrected based upon the result of this comparison. For example, a correction coefficient may be calculated from the ratio or the difference between the temperature of the test piece 16 and the actual temperature, and the aberration correction position of the spherical aberration correction lens 8 which has been read out may be multiplied by this correction coefficient, so as to yield a corrected or adjusted aberration correction position for the spherical aberration correction lens 8.

In this manner, with this third preferred embodiment of the microscope of the present invention, spherical aberration correction is performed in advance for the test piece 16, and it is possible to observe the subject of observation 5 using the spherical aberration correction positions corresponding to each observation position which have thus been stored in advance in the storage section 14. On the other hand, in the first and the second preferred embodiments, for each observation position, a plurality of images were taken while the spherical aberration correction lens 8 was shifted to a plurality of aberration correction positions, and the image among this plurality of images which had the greatest contrast was selected. Accordingly, when observing using this microscope according to this third embodiment, the operation of aberration correction for each observation position by shifting the spherical aberration correction lens 8 is curtailed, and thus it is possible greatly to shorten the time period taken for observation and imaging.

It should be noted that, when determining the aberration correction positions using the test piece 16, it would also be acceptable to detect the temperature of the test piece 16, and to store an aberration correction amount per unit temperature in the storage section 14.

Embodiment 4

With the microscopes of the first through the third embodiments, the aberration correction position for the spherical aberration correction lens 8 which yielded the highest contrast was determined, and the image which was formed at that position was selected as the image for which the aberration was most suitably corrected. Now, the fourth preferred embodiment of the present invention, which is a microscope of the type which is equipped with an automatic focus adjustment device for an objective lens which uses this kind of contrast method, to which is added the type of spherical aberration correction processing described above with reference to the second and the third embodiment, will be described.

Figure 2:
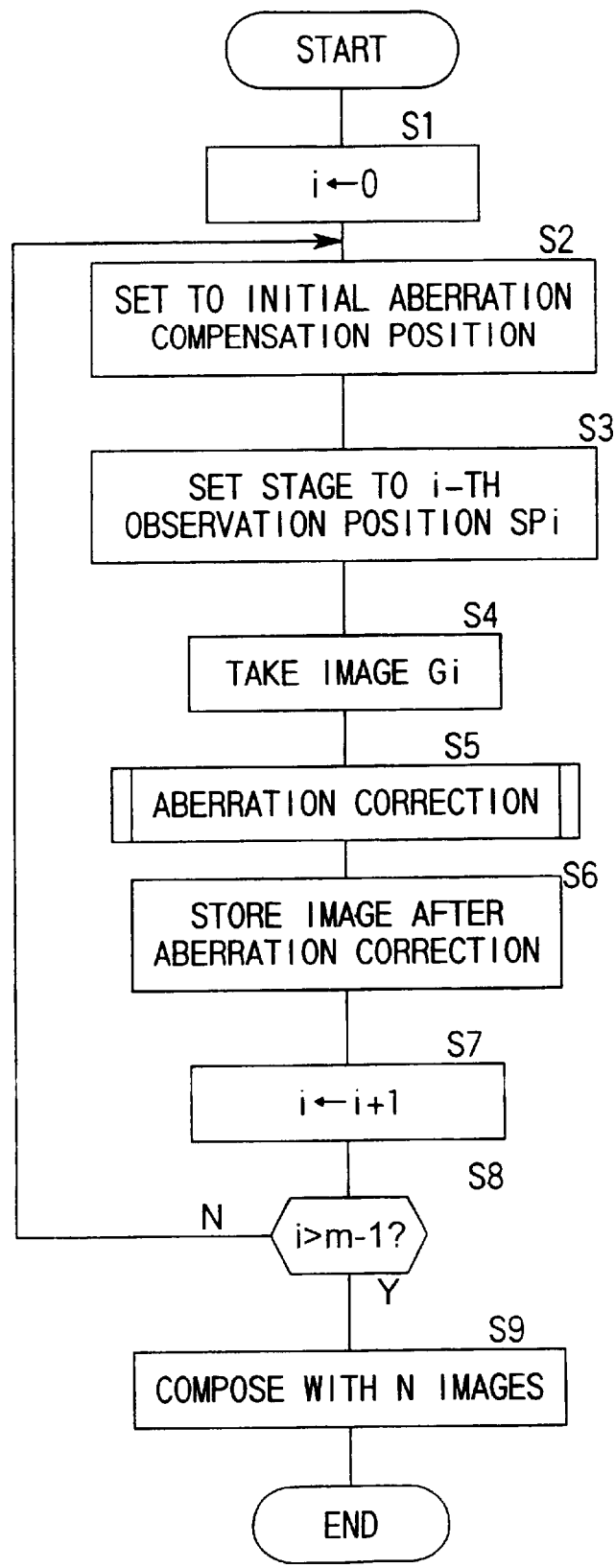
FIG. 2 is a flow chart showing the procedure followed when the microscope of FIG. 1 is taking a plurality of images.

This microscope according to the fourth preferred embodiment has the same structure as shown in FIG. 2; and, not only is an automatic focus adjustment procedure performed while the stage 2 is being shifted by the control section 12, but also images for which the aberration has been corrected are obtained for a plurality of observation positions, in the same manner as was done in the second embodiment described above.

When focusing upon the surface of a non-transparent specimen and observing a magnified image thereof, it is possible to adjust the focus position of the objective lens to the surface of the specimen using an automatic focus adjustment device. In this case, the control section 12 images the subject of observation with the stage at a predetermined position, and calculates the contrast of the image which is obtained. By the way, the control section 12 images the subject of observation while moving the electrically movable stage 2 by a predetermined amount in a predetermined direction, and calculates the contrast of the resultant image. The two contrasts are compared, and the image whose contrast is the larger is the one of which the focal adjustment is the more desirable. Based upon this kind of theory, it is possible to focus the objective lens 1 upon the surface of the subject of observation by selecting the image having the greatest contrast from among the plurality of images taken while moving the electrically movable stage 2 a number of times along the optical axis.

With this type of microscope, if tomography is to be performed for a transparent specimen 3 of living material as was explained with reference to the second preferred embodiment, then the stage 2 is shifted along the optical axis and is set to a plurality of observation positions based upon commands from the control section 12, and an image on which aberration has been corrected is formed at each observation position. Accordingly, along with making it possible for the drive section 9 of the stage 2 to be shared with the automatic focus adjustment device, and the algorithm in the control section 12 which performs contrast calculation and selects the image which has the highest contrast also can be shared with the automatic focus adjustment device.

It should be noted that in the microscopes according to the above described embodiments the spherical aberration correction lens 8 is separate from the objective lens. However, the present invention can also be applied to a microscope which comprises a spherical aberration correction lens within the objective lens, and a further spherical aberration correction lens 8, which is used to correct for aberration which has not been corrected by the spherical aberration correction lens within the objective lens. With this type of embodiment it is possible simply and easily to eliminate spherical aberration using the spherical aberration correction lens 8, even if the kind of thickness of the cover glass is increased above that originally assumed.

Further, the above explanation was made in terms of performing tomography upon a test piece of semi-transparent living material. However, the present invention is not to be considered as being limited to the case of performing tomography. Accordingly, it can also be applied to a microscope which forms an image of a specific layer of a test piece of transparent or semi-transparent living material. A subject of observation other than living material would also be acceptable.

Yet further, in item (1) of the prior art, the method for operation of a correction ring of an objective lens with an attached spherical aberration correction lens so as to eliminate spherical aberration has been explained because the operation is complicated. In this connection, a microscope which is not provided with any spherical aberration correction lens with such a prior art correction ring, and which eliminates spherical aberration due to variation of the thickness of the cover glass just by using the above described spherical aberration correction lens 8, also comes within the scope of the present invention.

Moreover, although the above described embodiments of the present invention were upright type microscopes, the present invention can also be applied to an inverted type microscope.

What is claimed is:

1. A microscope, comprising:
   an objective lens which focuses upon and observes a specimen mounted upon a stage;
   an imaging device which receives an optical image of the specimen captured by said objective lens and outputs it as an image signal;
   a correction optical system provided between said objective lens and said imaging device, which corrects spherical aberration included in said optical image;
   an optical system drive device which drives said correction optical system to control an amount of spherical aberration correction; and
   a control section which drives said correction optical system by said optical system drive device so as to vary the amount of spherical aberration correction, based upon the image signal from said imaging device.

2. A microscope according to claim 1, wherein
   said control section:
   images the specimen with said imaging device while varying the amount of spherical aberration correction by said correction optical system;
   selects an image of which spherical aberration is the least from among a plurality of images which have been imaged by said imaging device; and
   drives said correction optical system so as to bring the amount of spherical aberration correction to an value when the selected image was imaged.

3. A microscope according to claim 2, wherein said control section selects, from among said plurality of images which have been imaged, an image of which a contrast is the greatest as the image of which spherical aberration is the least.

4. A microscope according to claim 1, further comprising an electrically operated raising and lowering device which raises and lowers said stage, wherein
   said control section:
   sets said stage to a plurality of observation positions by raising and lowering it by said electrically operated raising and lowering device;
   for each said observation position, images the specimen with said imaging device while varying the amount of spherical aberration correction by said correction optical system with said optical system drive device; and
   stores in an image storage device an image of which spherical aberration is the least from among the plurality of images which have been imaged by said imaging device.

5. A microscope according to claim 4, wherein said control section selects, from among said plurality of images which have been imaged, an image of which a contrast is the greatest as the image of which spherical aberration is the least.

6. A microscope according to claim 1, wherein
   said control section:
   images a test piece having an optical characteristics equivalent to the specimen with said imaging device;
   selects an image of which spherical aberration is the least from among a plurality of images which have been imaged while varying the amount of spherical aberration correction;
   stores an aberration correction position of said correction optical system when the selected image was obtained; and
   when said specimen is being imaged by said imaging device, reads out said aberration correction position which has been stored and drives said correction optical system.

7. A microscope according to claim 6, wherein said test piece has an index of refraction equivalent to said specimen.

8. A microscope according to claim 6, wherein said control section detects a temperature of said test piece when storing said aberration correction position using said test piece, and corrects said aberration correction position based upon this detected temperature when storing it.

9. A microscope according to claim 6, wherein
   said control section:
   calculates a difference between the temperature determined when storing said aberration correction position using said test piece, and a temperature when imaging the specimen; and
   corrects said aberration correction position according to said temperature difference.

10. A microscope according to claim 4, further comprising a focus detection device which calculates a focusing state of said objective lens based upon a plurality of said image signals imaged while shifting said stage along an optical axis, and wherein
    said electrically operated raising and lowering device shifts said stage based upon a detection signal from said focus detection device.

11. A microscope according to claim 10, wherein said focus detection device calculates a stage position corresponding to an image of which a contrast is the greatest among the plurality of images which have been imaged based upon said image signals, as a focused state.

12. A microscope, comprising:
    an objective lens which focuses upon and observes a specimen mounted upon a stage;
    an imaging device which receives an optical image of the specimen captured by said objective lens and outputs it as an image signal;
    a correction optical system provided between said objective lens and said imaging device, which corrects spherical aberration included in said optical image;
    an optical system drive device which drives said correction optical system to control an amount of spherical aberration correction; and
    a control section which performs imaging with the amount of spherical aberration correction when an image was obtained of which spherical aberration was the least among a plurality of images which were imaged by said imaging device while varying said spherical aberration correction amount.

13. A microscope according to claim 10, wherein an algorithm in which said control section selects the image of which spherical aberration is the least based upon a plurality of images which have been imaged by said imaging device and an algorithm in which said focus detection device calculates the focusing state of said objective lens based upon a plurality of images which have been imaged by said imaging device are common to each other.

* * * * *